(12) United States Patent
Hämäläinen et al.

(10) Patent No.: US 7,591,988 B2
(45) Date of Patent: Sep. 22, 2009

(54) METHOD FOR PROCESSING FLUE GASES

(75) Inventors: Risto Hämäläinen, Tampere (FI); Keijo Salmenoja, Monnanummi (FI); Ismo Reilama, Reila (FI)

(73) Assignee: Metso Power Oy, Tampere (FI)

( * ) Notice: Subject to any disclaimer, the term of this patent is extended or adjusted under 35 U.S.C. 154(b) by 219 days.

(21) Appl. No.: 11/582,509

(22) Filed: Oct. 18, 2006

(65) Prior Publication Data
US 2007/0092422 A1    Apr. 26, 2007

(30) Foreign Application Priority Data
Oct. 18, 2005    (FI)    .................................. 20051050

(51) Int. Cl.
*B01D 53/50*    (2006.01)
(52) U.S. Cl. ............... 423/242.1; 423/243.08; 423/244.07; 423/244.08; 162/51
(58) Field of Classification Search ............ 162/51; 423/242.1, 243.08, 244.07, 244.08
See application file for complete search history.

(56) References Cited

U.S. PATENT DOCUMENTS

| | | | |
|---|---|---|---|
| 3,183,145 A | 5/1965 | Collins, Jr. | |
| 3,796,628 A * | 3/1974 | Sen | ............................. 162/51 |
| 4,431,617 A | 2/1984 | Farin | |
| 5,597,445 A | 1/1997 | Westerberg | |
| 6,136,144 A | 10/2000 | Martin et al. | |

FOREIGN PATENT DOCUMENTS

| | | |
|---|---|---|
| CA | 2 144 827 C | 9/1995 |
| EP | 1524241 A1 | 4/2005 |
| FI | 81140 B | 5/1990 |
| FI | 920531 A | 8/1993 |
| FI | 104504 B | 10/1994 |
| JP | 08012389 A | 1/1996 |
| WO | WO 98/55685 A1 | 12/1998 |

OTHER PUBLICATIONS

European Search Report—Feb. 27, 2007.

* cited by examiner

*Primary Examiner*—Timothy C Vanoy
(74) *Attorney, Agent, or Firm*—Venable LLP; Eric J. Franklin

(57) ABSTRACT

In a method for processing flue gases, flue gases from an incineration plant for non-condensable gases of a kraft pulp mill are scrubbed by means of a calcium compound. The calcium compound is lime mud taken from the chemical recirculation of the kraft pulp mill after causticization and before a lime reburning kiln, and it is used in the scrubbing of gas as a substance reacting with sulphur dioxide.

12 Claims, 2 Drawing Sheets

METHOD FOR PROCESSING FLUE GASES

FIELD OF THE INVENTION

The invention relates to a method for processing flue gases, in which method flue gases from a non-condensable gas incineration plant of a kraft pulp mill are scrubbed by means of a calcium compound.

BACKGROUND OF THE INVENTION

In the sulphur circulation of a kraft pulp mill (sulphate pulp mill), non-condensible gases are produced which contain considerable amounts of sulphur compounds, such as hydrogen sulphide, methylmercaptan, dimethyl sulphide, and dimethyl disulphide. To eliminate odour problems, these so-called malodorous gases are incinerated, for example, in a separate incineration plant for non-condensible gases, wherein carbon dioxide, water and sulphur dioxide are produced. To minimize sulphur emissions caused by flue gases from the incineration plant, sulphur dioxide is normally bound with a sodium hydroxide solution in a caustic scrubber downstream of a waste heat boiler. By exploitation of the resulting chemicals ($Na_2SO_3$ and $NaHSO_3$) in different sections of the kraft pulp mill it is possible to control the Na/S balance of the process. By this technique it is possible to utilize a part of the chemicals.

Most commonly, however, the Na/S ratio is still adjusted by dissolving fly ash from the soda recovery boiler into water and by discharging it as sewage from the process. The need for dissolution may be several tens of tons of $Na_2SO_4$ per day. Furthermore, the washing, extraction, and dissolution/crystallization of fly ash have become more common as the need for removing harmful substances increases. In the above-mentioned processes, a considerable amount of sodium is always washed out into the water system and must be replaced by supplying, for example, caustic into the chemical recirculation. The cost of the caustic makeup at the plant may amount to even 1 million euro per year.

Attempts have been made to replace sodium hydroxide in gas scrubbing because of the entailed costs of chemicals. For this reason, Finnish patent 104504 presents the use of an alkaline calcium compound for the scrubbing of flue gases containing sulphur dioxide produced during the incineration of non-condensible gases in a kraft pulp mill. In said patent, the calcium compound is common limestone or another alternative calcium compound, such as alkaline calcium compounds of ash, particularly fly ash, from a bark-fired boiler in the same kraft pulp mill. The patent discloses how the calcium compound (calcium sulphate and sulphite) produced in a reaction with sulphur dioxide is finally led into the sewage system of the kraft pulp mill.

Furthermore, Finnish patent 93869 discloses a so-called dual alkali process in which a solution containing sodium bisulphite from a caustic scrubber of flue gases emitted by the incineration of non-condensible gases is treated with waste calcium oxide obtained from lime mud reburning. This is, in principle, a caustic scrubber in which sodium bisulphite is regenerated with calcium oxide to form sodium hydroxide which can be utilized in the caustic scrubber. At the same time, calcium sulphite and sulphate are produced which can be stored as waste. The method contains several steps and is difficult to implement.

FIG. 3 of Finnish patent 103532 shows a method in which calcium oxide obtained from the lime reburning kiln of a pulp mill is mixed into water and the calcium hydroxide thus obtained is led into a gas scrubber for scrubbing flue gases from a power boiler of the pulp mill, the flue gases containing sulphur compounds because the non-condensible gases of the pulp mill are also incinerated in the power boiler. This method is based on the utilization of calcium oxide and its conversion into calcium hydroxide.

Until now, there has been no method for processing flue gases produced by the incineration of non-condensible gases at the kraft pulp mill in a simple plant where the Na/S balance and the harmful substances of the process could be simultaneously controlled.

SUMMARY OF THE INVENTION

It is the aim of the invention to overcome the above-mentioned drawbacks and to present a new method for processing flue gases which can be implemented in a simple manner with low investment costs and by utilizing substances available at a kraft pulp mill. To attain this aim, the method according to the invention is primarily characterized in that the calcium compound is lime mud which is obtained from the calcium circulation between causticization and lime reburning in the chemical recirculation loop of the kraft pulp mill and which is used as a substance reacting with sulphur dioxide in gas scrubbing. It is possible to reduce the caustic makeup required for the control of Na/S balance and thereby to obtain significant savings in the costs of chemicals. The environmentally harmful discharge of flue ash in water systems can be significantly reduced or even stopped completely. On the other hand, the calcium used for the scrubbing, the lime mud, is free of charge and has to be discharged from the chemical recirculation in any case, to remove the harmful substances. Similarly, it can be used as such in a wet scrubber of gases.

Other substances which are harmful for the chemical recirculation in the sulphate pulp (kraft pulp) process, such as potassium and chloride, are discharged together with the lime mud. These are normally contained in the lime mud (calcium carbonate) obtained from the causticizing plant. If it is desirable to minimize the content of sodium and, correspondingly, the production of sodium sulphate in the scrubbing of gas, the lime mud is taken after one or more washing stages, for example after a lime mud filter.

The calcium compound produced from the lime mud in a reaction with sulphur dioxide (calcium sulphite and calcium sulphate) is discharged from the chemical recirculation loop. It is preferably used as a precoat at the green liquor dregs filter, where previously it has been commonplace to use lime mud from the causticizing plant.

In this context, the calcium circulation refers to the material flows of calcium compounds between causticization and lime reburning. The calcium compound is taken from this circulation in the form of calcium carbonate (lime mud precipitated in the causticization of green liquor). Calcium oxide (calcium oxide or caustic lime produced by lime reburning, i.e. the regeneration of lime) and calcium hydroxide (slaked lime produced from calcium oxide in a reaction with water) are also present in the calcium circulation.

BRIEF DESCRIPTION OF THE DRAWINGS

In the following, the invention will be described in more detail with reference to the appended drawings, in which.

DESCRIPTION OF THE PREFERRED EMBODIMENT

Figure 1:
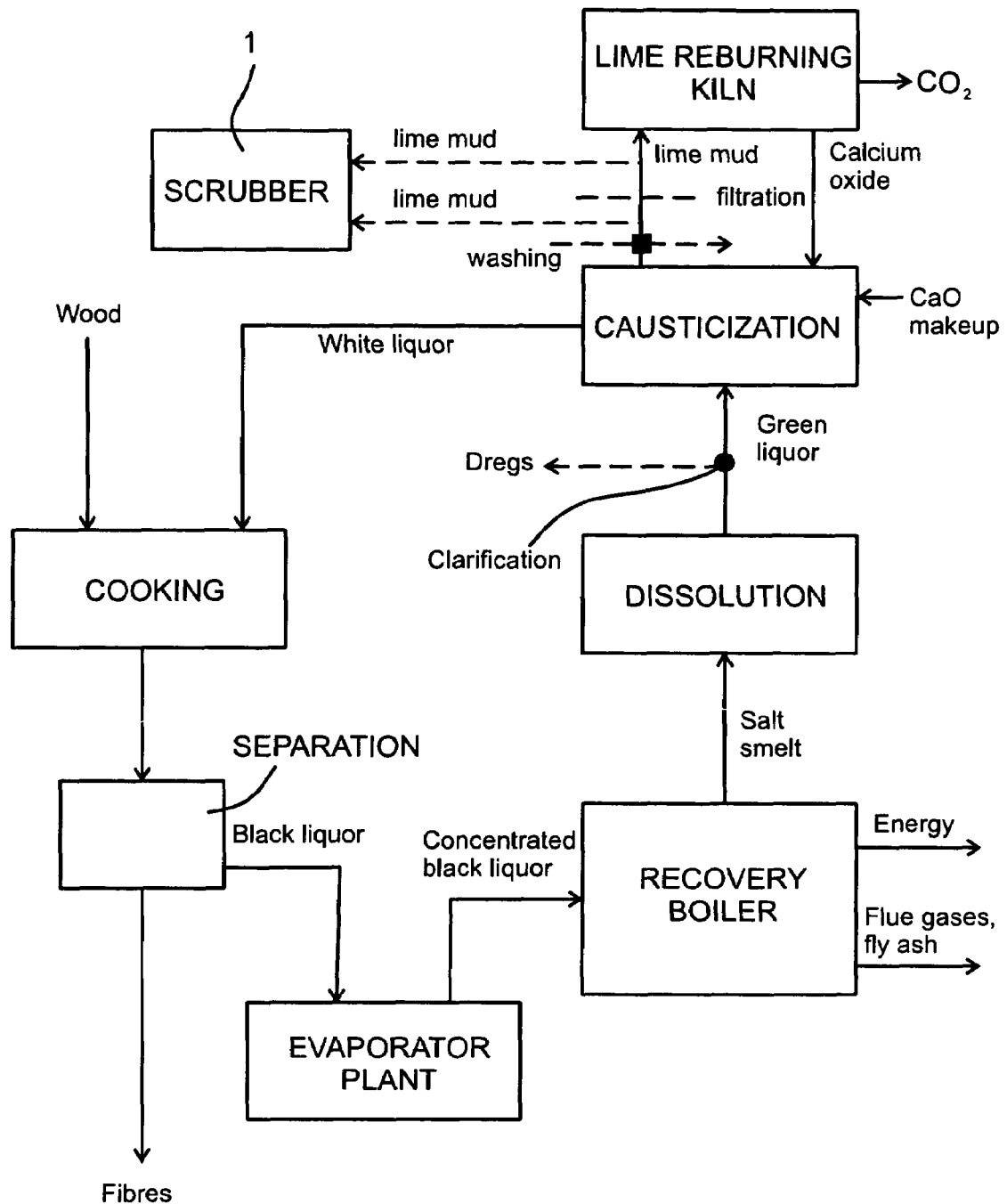
FIG. 1 shows the kraft pulp process in principle.

FIG. 1 illustrates the chemical recirculation loop of a sulphate pulp process in main principles. In a kraft pulp mill, wood material is cooked with a strongly alkaline cooking liquor (white liquor). The active primary chemicals of the alkaline cooking liquor are NaOH and $Na_2S$. As a result of the cooking, lignin is dissolved in the liquor and the fibres are released. After the cooking, the fibres are separated from the liquor which, after the cooking, contains lignin and is called black liquor. After this, water is evaporated from the black liquor in an evaporator plant to concentrate it for burning. The burning takes place in a boiler designed for this purpose, a recovery boiler, which produces both energy, as the organic components of black liquor burn, and chemicals to be recirculated in the process. These chemicals are in the form of salt smelt whose primary components are $Na_2S$ and $Na_2CO_3$. Also fly ash that contains sodium sulphate is discharged with the flue gases from the recovery boiler.

The salt smelt obtained from the recovery boiler is dissolved in water, yielding green liquor. The green liquor also contains insoluble compounds, for which reason it is clarified, and the dregs obtained from the clarification are washed. After the clarification, the green liquor is causticized in a causticizing plant by adding calcium oxide, i.e. caustic lime, which forms calcium hydroxide with water, after which sodium hydroxide is formed from the sodium carbonate of the green liquor, and the calcium carbonate (lime mud) is precipitated. After the calcium carbonate has been separated, white liquor is obtained, which can be re-used for kraft cooking. The reactions are known as such, and they will not be described in more detail in this context.

The separated lime mud is washed and regenerated by lime reburning in a so-called lime reburning kiln, which produces carbon dioxide, discharged as gas, and solid calcium oxide, i.e. caustic lime, which can be re-used in the causticization of green liquor in the above-described manner.

The above description is simplified and it does not list all the chemicals present in various solutions in the different steps; nor does it describe all the process stages, such as the washing stages.

Figure 2:
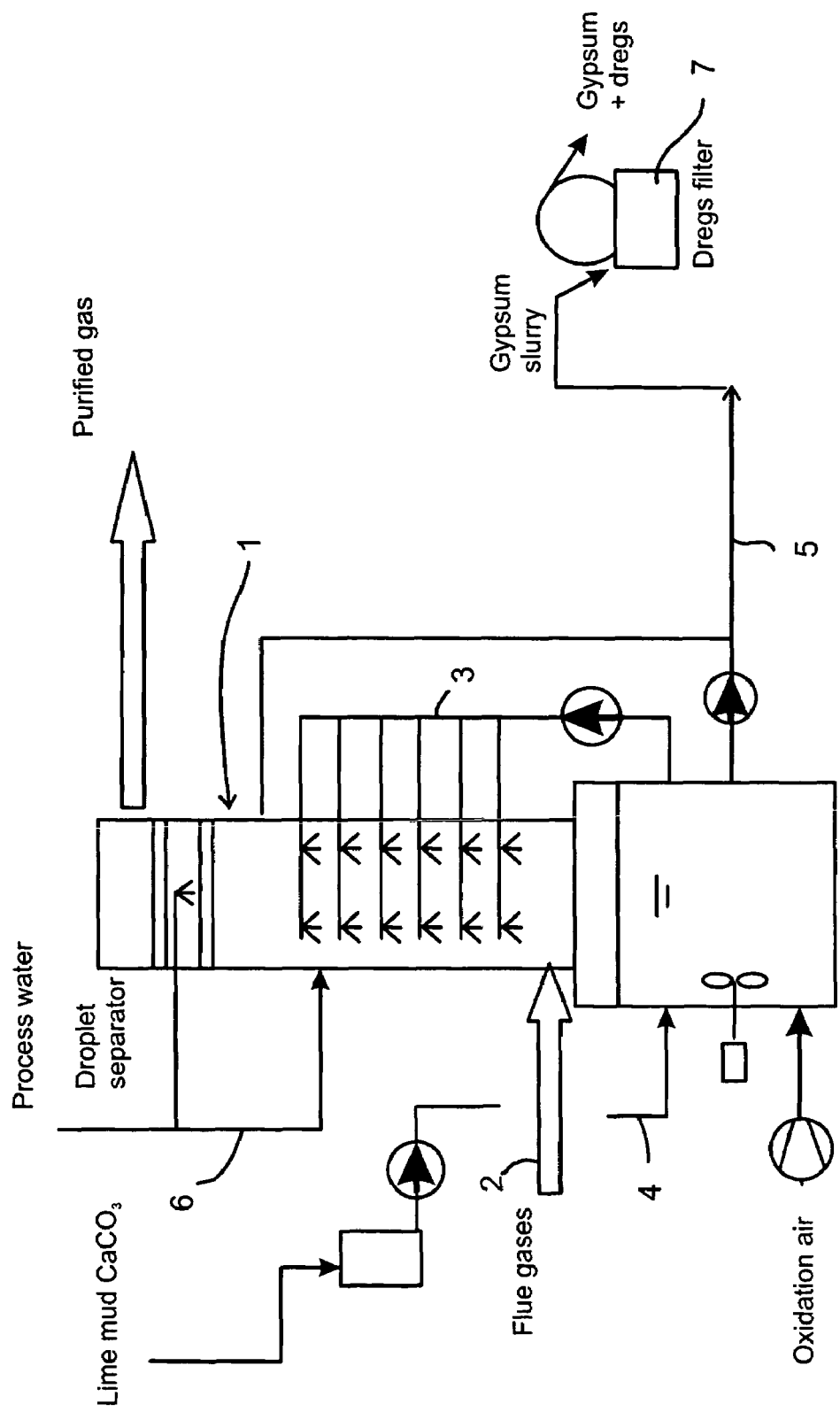
FIG. 2 shows the method according to the invention in a chart.

FIG. 2 illustrates the processing of flue gases in a kraft pulp mill according to the invention.

In a kraft pulp mill, significant amounts of gaseous sulphur compounds, such as hydrogen sulphide, methylmercaptan, dimethyl sulphide and dimethyl disulphide, are produced at different stages and incinerated in an incineration plant for non-condensible gases in the mill. Said non-condensible gases originate primarily from the digester and the evaporator plant of the pulp mill. The incineration plant for non-condensible gases refers to a plant designed solely for the incineration of non-condensible gases. The flue gases produced in the incineration contain sulphur dioxide which is bound in a gas scrubber. The gas scrubber 1 shown in the figure is a so-called wet scrubber where lime mud produced in the sulphate pulp (kraft pulp) process of the same mill is used as the chemical for binding sulphur dioxide. The lime mud is obtained from the above-described calcium circulation between causticization and lime reburning, upstream of the lime reburning kiln. In the figure, lime mud, i.e. calcium carbonate, $CaCO_3$, precipitated in the causticization of green liquor, is supplied into the gas scrubber. FIG. 1 illustrates by a broken line the introduction of lime mud into the gas scrubber from the calcium circulation between the causticization and the lime reburning kiln.

To minimize the quantity of sodium in the scrubber, lime mud is separated preferably after one or more washing stages, because sodium is dissolved in the washing water. For example, it is possible to supply the gas scrubber with a part of the material stream flowing to the lime mud filter after the last washing step, or with a part separated from the lime mud that is obtained from the lime mud filter and directed to the lime reburning kiln.

The calcium compound is conveyed via a duct 4 to the bottom part of the scrubber equipped with an agitator. The flue gases containing sulphur dioxide enter the scrubber via a duct 2 from the incineration plant for non-condensible gases. The scrubbed flue gases exit from the top part of the scrubber. The scrubber 1 is provided with a washing water circulation 3 where a washing liquid is introduced from the bottom part of the scrubber to the top part of the scrubber, from which it is sprayed counter-currently to the flue gases to be scrubbed, back to the bottom part of the scrubber. The process water is introduced via a duct 6 to the scrubber. The slurry (gypsum slurry) formed in the scrubber and containing calcium sulphite and calcium sulphate is discharged from the bottom part of the scrubber via a duct 5. Sulphur is discharged together with the slurry from the chemical recirculation of the sulphate pulp process. Because the calcium is taken from the chemical recirculation of the sulphate pulp process at a point where harmful substances (primarily potassium and chloride) are also discharged from the process together with calcium, also these substances can be removed with the slurry.

By separating a part of the lime mud for gas scrubbing before the lime reburning kiln, it is simultaneously possible to reduce the quantity of harmful substances entering the lime reburning kiln. The separated part is replaced with fresh calcium that is introduced in a suitable point in the calcium circulation, according to FIG. 1 in the form of CaO to the causticization step.

The above-described scrubber is only one example of a scrubber for flue gases containing sulphur dioxide, usable according to the invention at a kraft pulp mill, and the invention is not restricted to this structure. It is essential that it is a wet scrubber utilizing lime mud originating from the sulphate pulp process of the mill, where said calcium compound is used as an agent for binding sulphur dioxides originating from the same process from the flue gases.

The calcium sulphate and sulphite from the scrubber 1 can be discharged as waste. According to an advantageous embodiment, the gypsum slurry, thus containing the sulphur bound by scrubbing, is led in a way shown in FIG. 2 to the causticizing plant, to a filter 7 for the dregs obtained in the clarification of green liquor (a green liquor dregs filter), where it is used as a precoat. In prior art, lime mud from the causticizing plant has been used as a precoat for the filter. In the invention, the lime mud is replaced by gypsum slurry, and the lime mud in turn is used for binding sulphur dioxide from flue gases. The particle size of the gypsum obtained from the gas scrubbing is larger than that of lime mud, for which reason it is very suitable for this purpose. The filtrate waters, which also contain harmful substances entrained in the lime supplied into the scrubber, can be discharged into the sewage processing system of the mill when the precoat is formed, wherein the harmful substances are removed from the chemical recirculation loop.

The gypsum slurry can also be filtered separately and discharged as normal gypsum waste. The filtrate waters which contain harmful substances can be treated as sewage in the above-described manner.

The chart of the washing process shown in FIG. 2 is intended to illustrate the implementation of the invention in practice, and it should not be interpreted to limit the invention. The quantity of the sulphur dioxide to be removed can be adjusted, for example, to be such with respect to the chemical recirculation of the mill that the dissolution of fly ash from the soda recovery boiler into the water system can be cut out completely. There will be no fly ash losses, and no extraction apparatuses for fly ash will be needed.

What is claimed is:

1. A method for processing flue gases comprising:
   taking lime mud after causticization and before a lime reburning kiln from a calcium circulation of a kraft pulp process at a kraft pulp mill
   introducing flue gases from a non-condensible gas incineration plant of said kraft pulp mill to a scrubbing step, and
   using said lime mud as substance reacting with sulphur dioxide of said flue gases in said scrubbing step.

2. The method according to claim 1, wherein harmful substances of the kraft pulp process of the kraft pulp mill are also removed from the process together with the lime mud taken from the calcium circulation.

3. The method according to claim 2, wherein the harmful substances are potassium and chloride.

4. The method according to claim 1, wherein lime mud is separated for said gas scrubbing step after one or more washing stages.

5. The method according to claim 3, wherein lime mud is separated for said gas scrubbing step after one or more washing stages.

6. The method according to claim 4, wherein the lime mud is separated from the calcium circulation after a lime mud filter.

7. The method according to claim 5, wherein the lime mud is separated from the calcium circulation after a lime mud filter.

8. The method according to claim 1, wherein gypsum obtained from the gas scrubbing step is led to a green liquor dregs filter to form a precoat.

9. The method according to claim 3, wherein gypsum obtained from the gas scrubbing step is led to a green liquor dregs filter to form a precoat.

10. The method according to claim 4, wherein gypsum obtained from the gas scrubbing step is led to a green liquor dregs filter to form a precoat.

11. The method according to claim 6, wherein gypsum obtained from the gas scrubbing step is led to a green liquor dregs filter to form a precoat.

12. The method according to claim 8, wherein filtrate waters from the green liquor dregs filter are discharged from the chemical recirculation of the kraft pulp process into the sewage processing system of the kraft pulp mill when forming the precoat from the gypsum.

* * * * *